(12) United States Patent
Yao et al.

(10) Patent No.: US 12,092,884 B2
(45) Date of Patent: Sep. 17, 2024

(54) OPTICAL TRANSCEIVER INCLUDING CONNECTOR COUPLER WITH ELASTIC HOLDING ARM FOR HOLDING CONNECTOR

(71) Applicant: Global Technology Inc., Ningbo (CN)

(72) Inventors: Gaofei Yao, Ningbo (CN); Qilin Hong, Ningbo (CN); Yi Lin, Ningbo (CN); PengBin Lin, Ningbo (CN)

(73) Assignee: Global Technology Inc., Ningbo (CN)

( * ) Notice: Subject to any disclaimer, the term of this patent is extended or adjusted under 35 U.S.C. 154(b) by 162 days.

(21) Appl. No.: 18/075,695

(22) Filed: Dec. 6, 2022

(65) Prior Publication Data

US 2024/0069295 A1 Feb. 29, 2024

(30) Foreign Application Priority Data

Aug. 25, 2022 (CN) .......................... 202211023529.6

(51) Int. Cl.
*H04B 10/00* (2013.01)
*G02B 6/42* (2006.01)

(52) U.S. Cl.
CPC .......... *G02B 6/4292* (2013.01); *G02B 6/423* (2013.01); *G02B 6/4246* (2013.01)

(58) Field of Classification Search
CPC .... G02B 6/4292; G02B 6/423; G02B 6/4246; G02B 6/3825; G02B 6/3885
See application file for complete search history.

(56) References Cited

U.S. PATENT DOCUMENTS

| 10,440,799 | B2* | 10/2019 | Zheng | G02B 6/426 |
|---|---|---|---|---|
| 10,802,219 | B2* | 10/2020 | Lin | G02B 6/266 |
| 10,809,474 | B2* | 10/2020 | Wang | G02B 6/3825 |
| 11,520,108 | B2* | 12/2022 | Chen | G02B 6/3869 |
| 2015/0331208 | A1* | 11/2015 | Moriyama | G02B 6/4295 |
| | | | | 385/14 |
| 2020/0057199 | A1* | 2/2020 | Lin | G02B 6/3825 |
| 2020/0081193 | A1* | 3/2020 | Lin | G02B 6/3831 |
| 2020/0241211 | A1* | 7/2020 | Shonkwiler | G02B 6/3809 |
| 2020/0333539 | A1* | 10/2020 | Matsui | G02B 6/4249 |
| 2021/0215887 | A1* | 7/2021 | Cloud | G02B 6/3869 |
| 2021/0223483 | A1* | 7/2021 | Chen | G02B 6/3825 |
| 2021/0231885 | A1* | 7/2021 | Ger | G02B 6/4221 |
| 2022/0244471 | A1* | 8/2022 | Khazen | G02B 6/406 |

(Continued)

*Primary Examiner* — Agustin Bello
(74) *Attorney, Agent, or Firm* — Grossman Tucker Perreault & Pfleger, PLLC (57) ABSTRACT

An optical transceiver includes housing, connector coupler and internal optical connector. Opening of housing is located on a side of housing and connected to accommodation space of housing. Connector coupler includes positioning frame and at least one elastic holding arm. Elastic holding arm protrudes from positioning frame and forms holding space. Positioning frame is located between at least a part of elastic holding arm and opening. Positioning frame is disposed in accommodation space. Positioning recess is located on a side of positioning frame close to opening and connected to holding space. At least a part of internal optical connector is located in holding space to be held in position by elastic holding arm. Positioning recess is configured to position external optical connector so as to allow internal optical connector to be plugged with and optically coupled to external optical connector.

10 Claims, 8 Drawing Sheets

(56) References Cited

U.S. PATENT DOCUMENTS

| | | | |
|---|---|---|---|
| 2023/0324625 A1* | 10/2023 | Erdman | G02B 6/3809 |
| | | | 385/59 |
| 2024/0069295 A1* | 2/2024 | Yao | G02B 6/4292 |
| 2024/0069296 A1* | 2/2024 | Meadowcroft | G02B 6/4284 |
| 2024/0142715 A1* | 5/2024 | Higley | G02B 6/3825 |
| 2024/0151912 A1* | 5/2024 | Higley | G02B 6/3885 |
| 2024/0184060 A1* | 6/2024 | Kuffel | G02B 6/3831 |

* cited by examiner

OPTICAL TRANSCEIVER INCLUDING CONNECTOR COUPLER WITH ELASTIC HOLDING ARM FOR HOLDING CONNECTOR

CROSS-REFERENCE TO RELATED APPLICATIONS

This non-provisional application claims priority under 35 U.S.C. § 119(a) on Patent Application No(s). 202211023529.6 filed in China, on Aug. 25, 2022, the entire contents of which are hereby incorporated by reference.

BACKGROUND

1. Technical Field

The present disclosure relates to optical communication, more particularly to an optical transceiver.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

Generally, as to an optical transceiver, a receptacle is provided in the optical transceiver for securely holding a male optical connector and a female optical connector in position. With a receptacle with simplified structure, the assembling process of the optical transceiver could become less complicated, which might in turn reduce the manufacture cost of the optical transceiver.

SUMMARY

According to one aspect of the present disclosure, an optical transceiver is configured for an external optical connector to be plugged therein. The optical transceiver includes a housing, a connector coupler and an internal optical connector. An opening of the housing is located on a side of the housing and is connected to an accommodation space of the housing. The connector coupler includes a positioning frame and at least one elastic holding arm. The at least one elastic holding arm protrudes from the positioning frame and forms a holding space. The positioning frame is located between at least a part of the at least one elastic holding arm and the opening. The positioning frame is disposed in the accommodation space. A positioning recess of the positioning frame is located on a side of the positioning frame close to the opening and is connected to the holding space. At least a part of the internal optical connector is located in the holding space to be held in position by the at least one elastic holding arm. The positioning recess of the positioning frame is configured to position the external optical connector so as to allow the internal optical connector to be plugged with and optically coupled to the external optical connector.

According to another aspect of the present disclosure, an optical transceiver is configured for a first external optical connector and a second external optical connector to be plugged therein. The optical transceiver includes a housing, a first connector coupler, a second connector coupler, a first internal optical connector, a second internal optical connector, two first guiding protrusions and two second guiding protrusions. The housing includes a first housing, a second housing, a first partition and a second partition. The first housing is disposed on a side of the second housing. The first partition and the second partition are disposed in the first housing and the second housing, respectively. The first housing, the second housing, the first partition and the second partition together form a first opening, a first accommodation space, a second opening and a second accommodation space. The first opening and the second opening are located on a side of the housing and are spaced apart from each other. The first opening and the second opening are connected to the first accommodation space and the second accommodation space, respectively. The first connector coupler and the second connector coupler are disposed in the first accommodation space and the second accommodation space, respectively. The first internal optical connector and the second internal optical connector are disposed in the first accommodation space and the second accommodation space, respectively. The first internal optical connector and the first external optical connector are configured to be held in their respective positions via the first connector coupler. The second internal optical connector and the second external optical connector are configured to be held in their respective positions via the second connector coupler. The first opening and the second opening are configured for the first external optical connector and the second external optical connector to penetrate therethrough, respectively, so as to allow the first external optical connector and the second external optical connector to be plugged with and optically coupled to the first internal optical connector and the second internal optical connector, respectively. The two first guiding protrusions protrude from the first housing and the first partition, respectively. The two first guiding protrusions are located in the first accommodation space. The two first guiding protrusions are located opposite to each other and are located between the first opening and the first connector coupler to guide the movement of the first external optical connector. The two second guiding protrusions protrude from the first housing and the first partition, respectively. The two second guiding protrusions are located in the second accommodation space. The two second guiding protrusions are located opposite to each other and are located between the second opening and the second connector coupler to guide the movement of the second external optical connector. The two first guiding protrusions, the two second guiding protrusions, the first housing and the first partition are integrally formed as a single piece.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
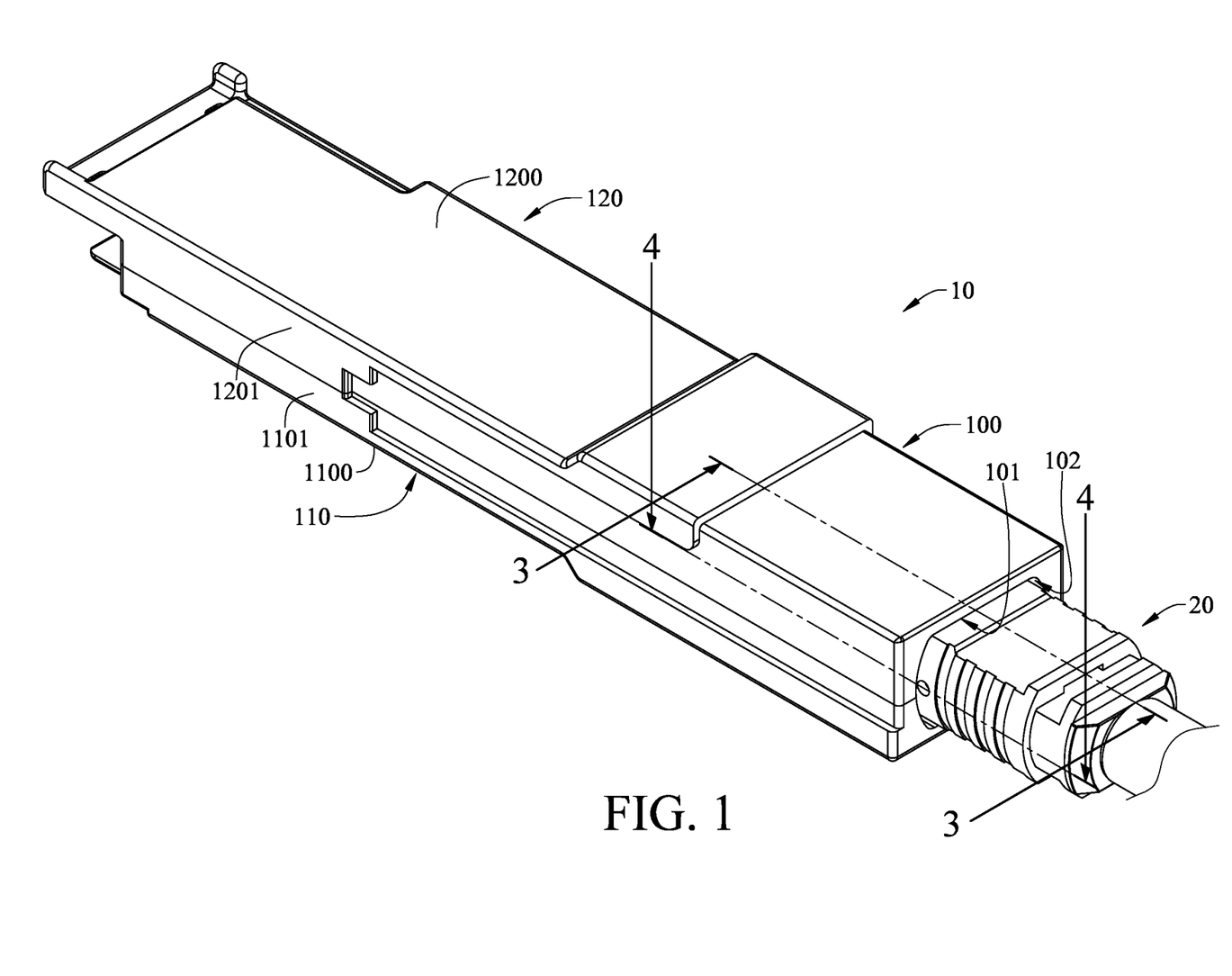
FIG. 1 is a perspective view of an optical transceiver according to a first embodiment of the disclosure and an external optical connector.
Figure 2:
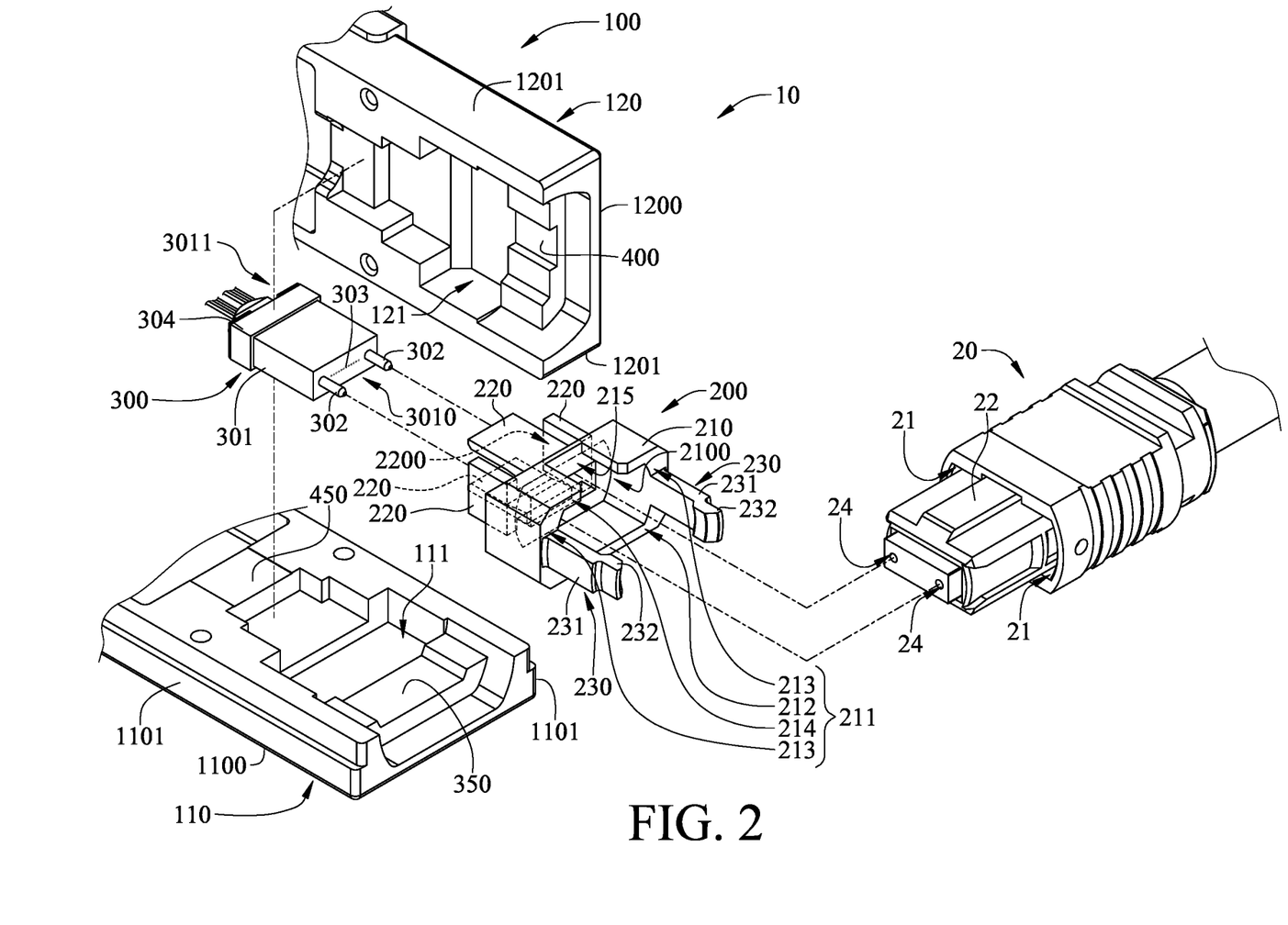
FIG. 2 is a partially enlarged exploded view of the optical transceiver and the external optical connector in FIG. 1.

Please refer to FIGS. 1-2. FIG. 1 is a perspective view of an optical transceiver according to a first embodiment of the disclosure and an external optical connector. FIG. 2 is a partially enlarged exploded view of the optical transceiver and the external optical connector in FIG. 1.

In this embodiment, an optical transceiver 10 may be configured for an external optical connector 20 to be plugged therein. In this embodiment, the optical transceiver 10 may include a housing 100, a connector coupler 200, an internal optical connector 300, a first guiding protrusion 350 and a second guiding protrusion 400. In this embodiment, the internal optical connector 300 and the external optical connector 20 may be associated with Multi-fiber push on (MPO) connectors. Some optical components, such as transmitter optical subassembly (TOSA), receiver optical subassembly (ROSA) and printed circuit board assembly (PCBA), may be provided in the housing 100.

Figure 3:
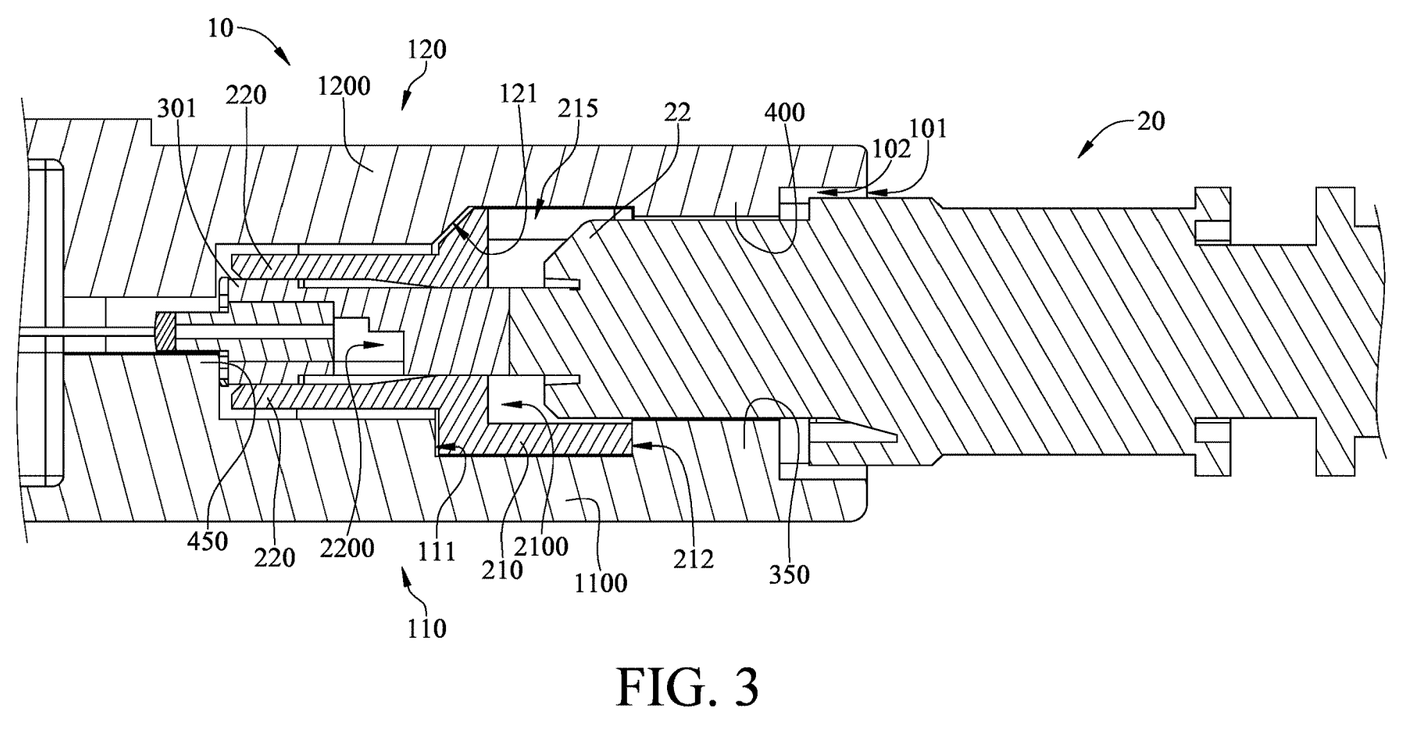
FIG. 3 is a partially enlarged cross-sectional view along line 3-3 in FIG. 1.
Figure 4:
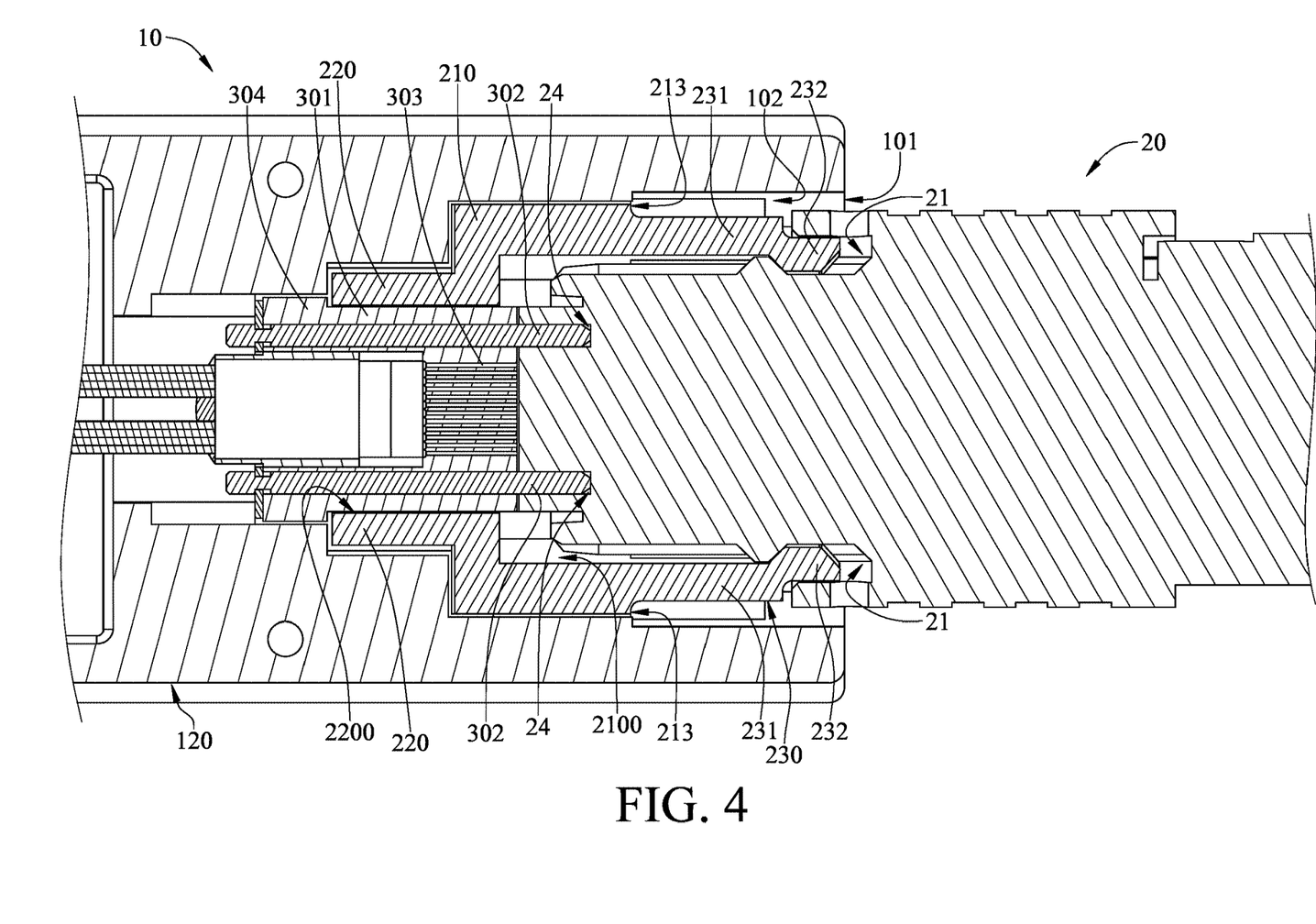
FIG. 4 is a partially enlarged cross-sectional view along line 4-4 in FIG. 1.

Please refer to FIGS. 2-4. FIG. 3 is a partially enlarged cross-sectional view along line 3-3 in FIG. 1. FIG. 4 is a partially enlarged cross-sectional view along line 4-4 in FIG. 1.

The housing 100 may have an opening 101 and an accommodation space 102. The opening 101 may be located on a side of the housing 100, and may be connected to the accommodation space 102. The housing 100 may include a first housing 110 and a second housing 120. The first housing 110 may be disposed on a side of the second housing 120. The first housing 110 and the second housing 120 may together form the opening 101 and the accommodation space 102. The first guiding protrusion 350 and the second guiding protrusion 400 may protrude from the first housing 110 and the second housing 120, respectively. The first guiding protrusion 350 and the second guiding protrusion 400 may be located in the accommodation space 102. The first guiding protrusion 350 and the second guiding protrusion 400 may face each other. The first guiding protrusion 350 and the first housing 110 may be integrally formed as a single piece. The second guiding protrusion 400 and the second housing 120 may be integrally formed as a single piece.

In this embodiment, the first housing 110 may have a first confining recess 111. The first confining recess 111 may be connected to the accommodation space 102. The first guiding protrusion 350 may be located between the first confining recess 111 and the opening 101. In this embodiment, the second housing 120 may have a second confining recess 121. The second confining recess 121 may be connected to the accommodation space 102. The second guiding protrusion 400 may be located between the second confining recess 121 and the opening 101.

In this embodiment, the optical transceiver 10 may further include a blocking protrusion 450. The blocking protrusion 450 may protrude from the first housing 110 and may be located in the accommodation space 102.

In this embodiment, the first housing 110 may include a first plate 1100 and two first side plates 1101. The two first side plates 1101 may stand on opposite sides of the first plate 1100, respectively. The two first side plates 1101 may be spaced apart from each other. In this embodiment, the second housing 120 may include a second plate 1200 and two second side plates 1201. The two second side plates 1201 may stand on opposite sides of the second plate 1200, respectively. The two second side plates 1201 may be spaced apart from each other. The two first side plates 1101 may be stacked on the two second side plates 1201, respectively. In this embodiment, the first confining recess 111, the first guiding protrusion 350 and the blocking protrusion 450 may be located on a side of the first plate 1100 that is closer to the second plate 1200. The second confining recess 121 and the second guiding protrusion 400 may be located on a side of the second plate 1200 that is closer to the first plate 1100.

In this embodiment, the first housing 110 and the second housing 120 may be two separate components that are assembled with each other. However, in other embodiments, the first housing and the second housing may be integrally formed as a single piece.

In this embodiment, the connector coupler 200 may include a positioning frame 210, a plurality of elastic holding arms 220 and two elastic fastening arms 230. The positioning frame 210 may be accommodated within the accommodation space 102. More specifically, in one embodiment, opposite sides of the positioning frame 210 might be accommodated in the first confining recess 111 and the second confining recess 121, respectively. The positioning frame 210 may have a positioning recess 2100. The positioning recess 2100 may be located on a side of the positioning frame 210 that is closer to the opening 101. The positioning recess 2100 may be configured to position the external optical connector 20. The first guiding protrusion 350 and the second guiding protrusion 400 may be located between the opening 101 and the positioning frame 210 to guide the movement of the external optical connector 20.

In this embodiment, the elastic holding arms 220 may be spaced apart from one another to together form a holding space 2200. The holding space 2200 may be connected to the positioning recess 2100. In this embodiment, the elastic holding arms 220 may protrude from the positioning frame 210 along a direction away from the opening 101. In addition, the positioning frame 210 may be located between an entire of each elastic holding arm 220 and the opening 101. However, in other embodiments, the positioning frame may be located between a part of the elastic holding arm and the opening.

In this embodiment, there are a plurality of elastic holding arms 220, but the disclosure is not limited by the number of the elastic holding arms. In other embodiments, there may merely be a single one elastic holding arm, and such elastic holding arm may be a plate that is in an annular shape and surrounds at least a part of the internal optical connector.

Each of the two elastic fastening arms 230 may include a cantilever 231 and a fastening protrusion 232. The two cantilevers 231 may be spaced apart from each other. The two fastening protrusions 232 may protrude from the two cantilevers 231, respectively. The two fastening protrusions 232 may be located between the two cantilevers 231. The two fastening protrusions 232 may be configured to be fastened in two fastening slots 21 of the external optical connector 20, respectively. In this embodiment, the two cantilevers 231 may protrude from the positioning frame 210 toward the opening 101. In addition, each of the two elastic fastening arms 230 may be entirely located between the opening 101 and the positioning frame 210. However, in other embodiments, only a part of each of the two elastic fastening arms may be located between the opening and the positioning frame.

In this embodiment, the positioning frame 210 may have an end surface 211. The end surface 211 may face toward the opening 101. The end surface 211 may include a first contact surface 212, two side end surfaces 213 and a second contact surface 214. The two side end surfaces 213 may be spaced apart from each other. Opposite sides of each side end surface 213 may be connected to the first contact surface 212 and the second contact surface 214, respectively. The first contact surface 212 may be located in the first confining recess 111 to be in contact with the first guiding protrusion 350. The second contact surface 214 may be located in the second confining recess 121 to be in contact with the second guiding protrusion 400. The two cantilevers 231 of the two elastic fastening arms 230 may protrude from the two side end surfaces 213, respectively. The two side end surfaces 213 may be coplanar with the first contact surface 212 and the second contact surface 214, and the two side end surfaces 213, the first contact surface 212 and the second contact surface 214 may be coplanar to one another. A recess for accommodating the first guiding protrusion 350 may be formed between the first contact surface 212 and the opening 101, and another recess for accommodating the second guiding protrusion 400 may be formed between the second contact surface 214 and the opening 101. In this embodiment, the positioning frame 210 may further have a guiding recess 215. The guiding recess 215 may be formed on the second contact surface 214, and may guide the movement of the external optical connector 20 via a guiding protrusion 22 of the external optical connector 20.

In other embodiments, the first housing may not have the first confining recess 111 and the second housing may not have the second confining recess 121. In such embodiments, the positioning frame of the connector coupler may directly be located in the accommodation space.

In this embodiment, the connector coupler 200 might hold the external optical connector 20 in its position using the two elastic fastening arms 230 and the fastening slots 21 of the external optical connector 20 and the guiding recess 215 and the guiding protrusion 22 of the external optical connector 20. In other embodiments, the connector coupler may not include the two elastic fastening arms and the external optical connector may be held in position merely via the guiding recess and the guiding protrusion of the external optical connector. Alternatively, in still other embodiments, the connector coupler may not include the guiding recess and the external optical connector may be held in position merely using the two elastic fastening arms and the fastening slots of the external optical connector.

In this embodiment, the internal optical connector 300 may include a connector body 301, two guiding pins 302, a plurality of optical fibers 303 and a blocking plate 304. The connector body 301 may have an optical coupling side 3010 and an assembling side 3011 that are opposite from the optical coupling side 3010. The two guiding pins 302 may be spaced apart from each other, and may penetrate through the optical coupling side 3010 and the assembling side 3011 of the connector body 301. The optical fibers 303 may be disposed in the connector body 301, and may located on the optical coupling side 3010. The blocking plate 304 may surround the connector body 301, and may be located on the assembling side 3011 of the connector body 301. The connector body 301 of the internal optical connector 300 may be located in the holding space 2200 to be held in position by the elastic holding arms 220. Since the elastic holding arms 220 may be elastic and spaced apart from one another, the elastic holding arms 220 may absorb the assembling tolerance to more accurately position the internal optical connector 300. Specifically, when the size of the internal optical connectors 300 held in position in the holding space 2200 changes, the elastic holding arms 220 may expand or contract according to the size of the internal optical connector 300 based on the elasticity thereof. In other words, the size of the holding space 2200 may vary to match the size of the internal optical connector 300, allowing for the internal optical connectors 300 of different sizes to be firmly held in position in the holding space 2200.

As shown in FIG. 3, the blocking plate 304 of the internal optical connector 300 may be located between the blocking protrusion 450 and the opening 101, and thus the blocking protrusion 450 may prevent the internal optical connector 300 from being moved away from the opening 101. In addition, as shown in FIG. 4, in this embodiment, each of the elastic holding arms 220 may be located between a part of the blocking plate 304 of the internal optical connector 300 and the opening 101, and thus the blocking plate 304 may prevent the internal optical connector 300 from being moved toward the opening 101.

The external optical connector 20 may be held in position in the positioning frame 210 by the fastening protrusion 232 and the fastening slot 21 and may penetrate through the opening 101, so as to be plugged with and optically coupled to the internal optical connector 300. Specifically, in this embodiment, the internal optical connector 300 including two guiding pins 302 may be a male optical connector, and the external optical connector 20 having an insertion hole 24 may be a female optical connector. The guiding pins 302 may be configured to be respectively inserted in the insertion holes 24 so as to align the internal optical connector 300 with the external optical connector 20 and to allow the internal optical connector 300 to optically couple the external optical connector 20 with the optical fibers 304.

In other embodiments where the housing having one opening, the optical transceiver may not include the first guiding protrusion and the second guiding protrusion. Also, in other embodiments, the optical transceiver may not include the blocking protrusion.

Figure 5:
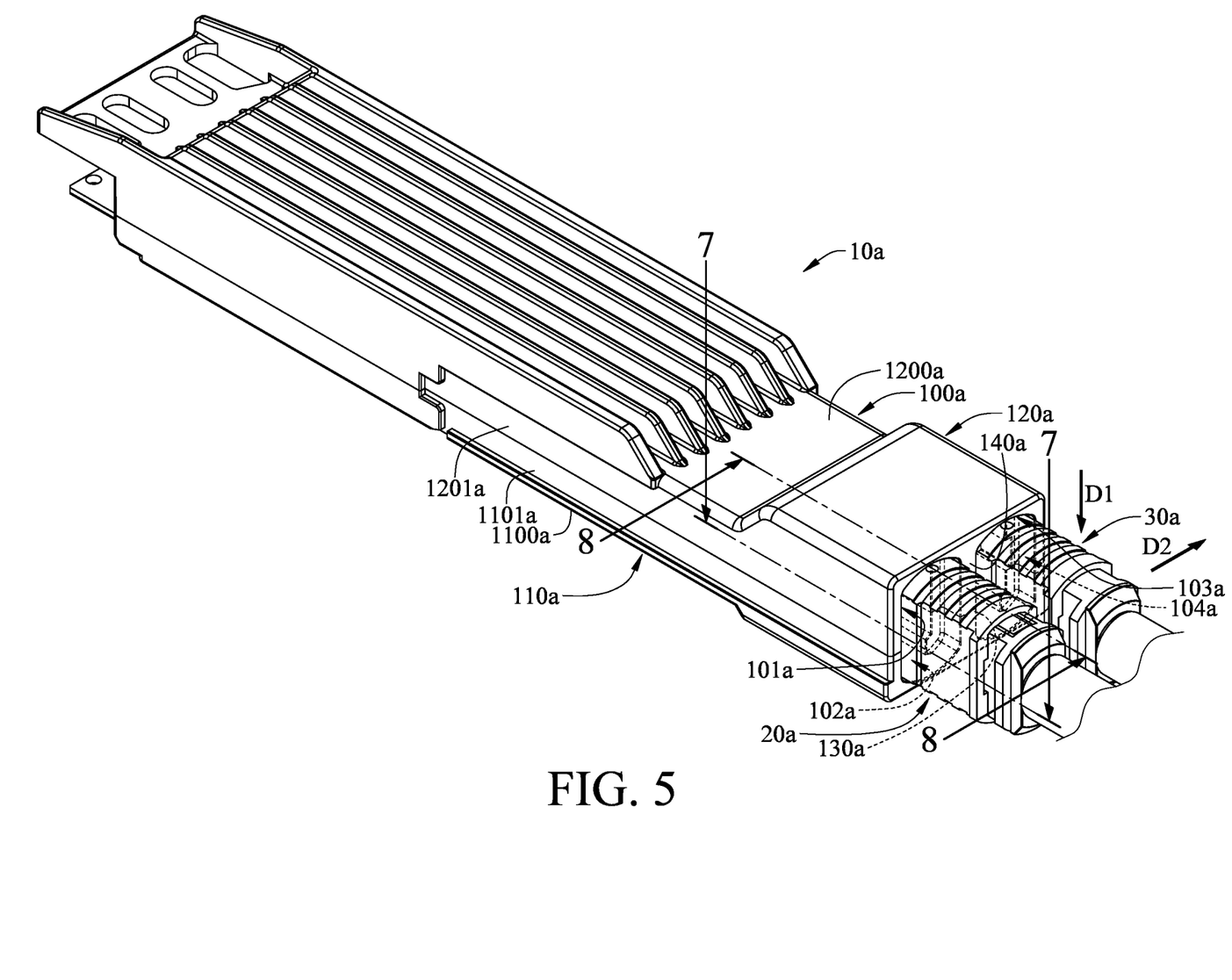
FIG. 5 is a perspective view of an optical transceiver according to a second embodiment of the disclosure and two external optical connectors.
Figure 6:
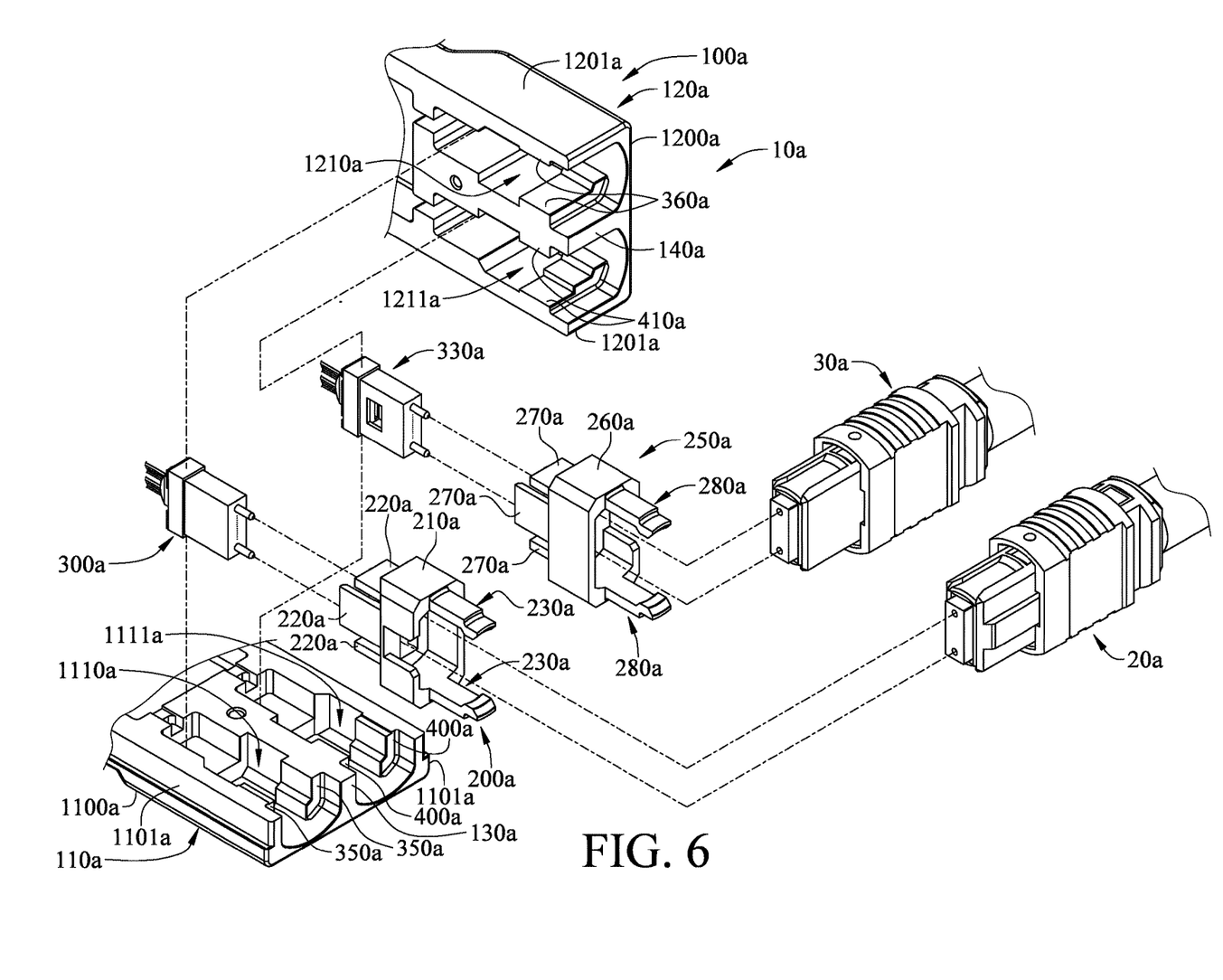
FIG. 6 is a partially enlarged exploded view of the optical transceiver and the external optical connectors in FIG. 5.

Please refer to FIGS. 5-6. FIG. 5 is a perspective view of an optical transceiver according to a second embodiment of the disclosure and two external optical connectors. FIG. 6 is a partially enlarged exploded view of the optical transceiver and the external optical connectors in FIG. 5.

In this embodiment, an optical transceiver 10a may be configured for a first external optical connector 20a and a second external optical connector 30a to be plugged therein. The optical transceiver 10a may include a housing 100a, a first connector coupler 200a, a second connector coupler 250a, a first internal optical connector 300a, a second internal optical connector 330a, two first guiding protrusions 350a and two second guiding protrusions 400a.

Figure 7:
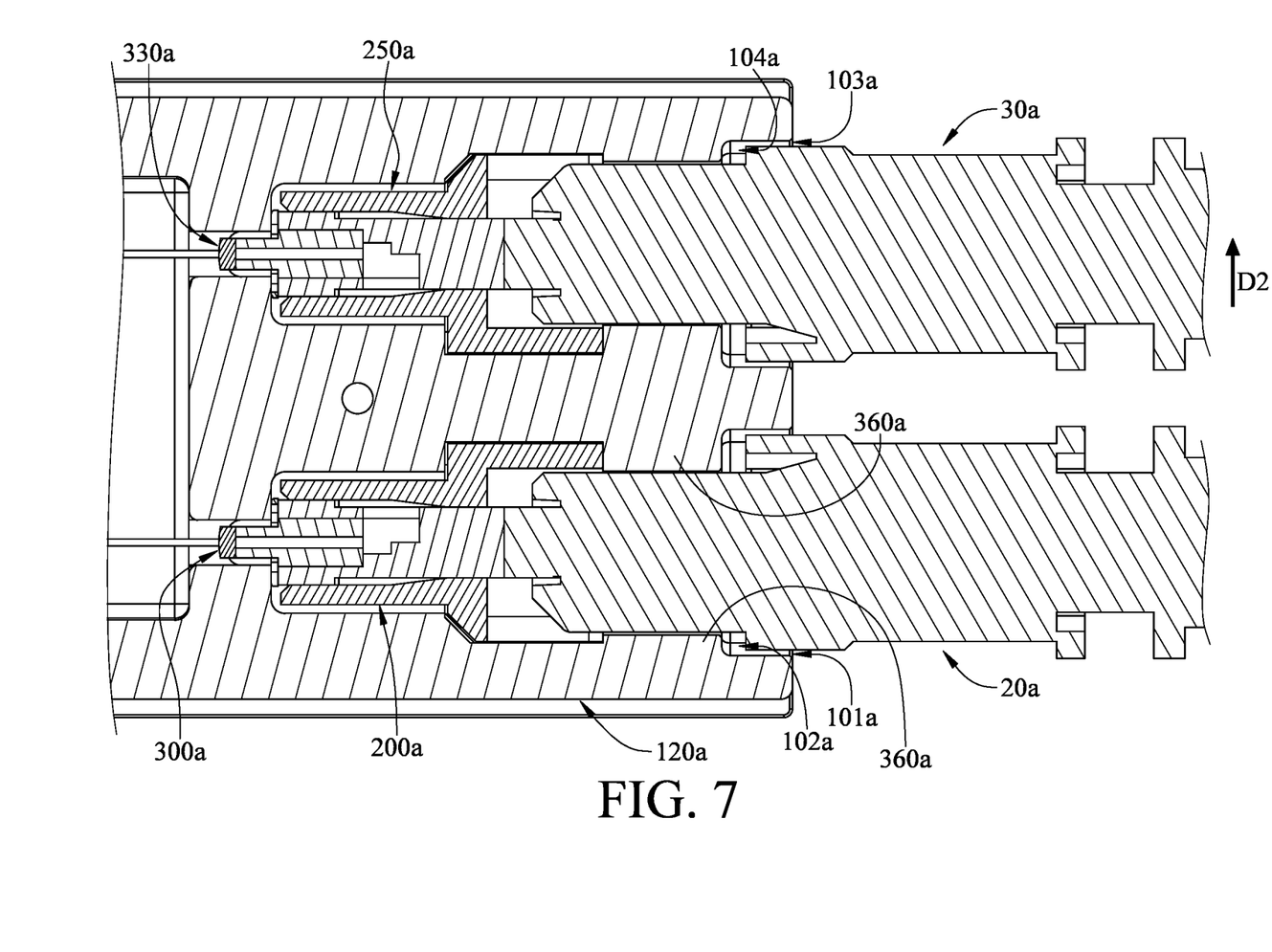
FIG. 7 is a partially enlarged cross-sectional view along line 7-7 in FIG. 5.
Figure 8:
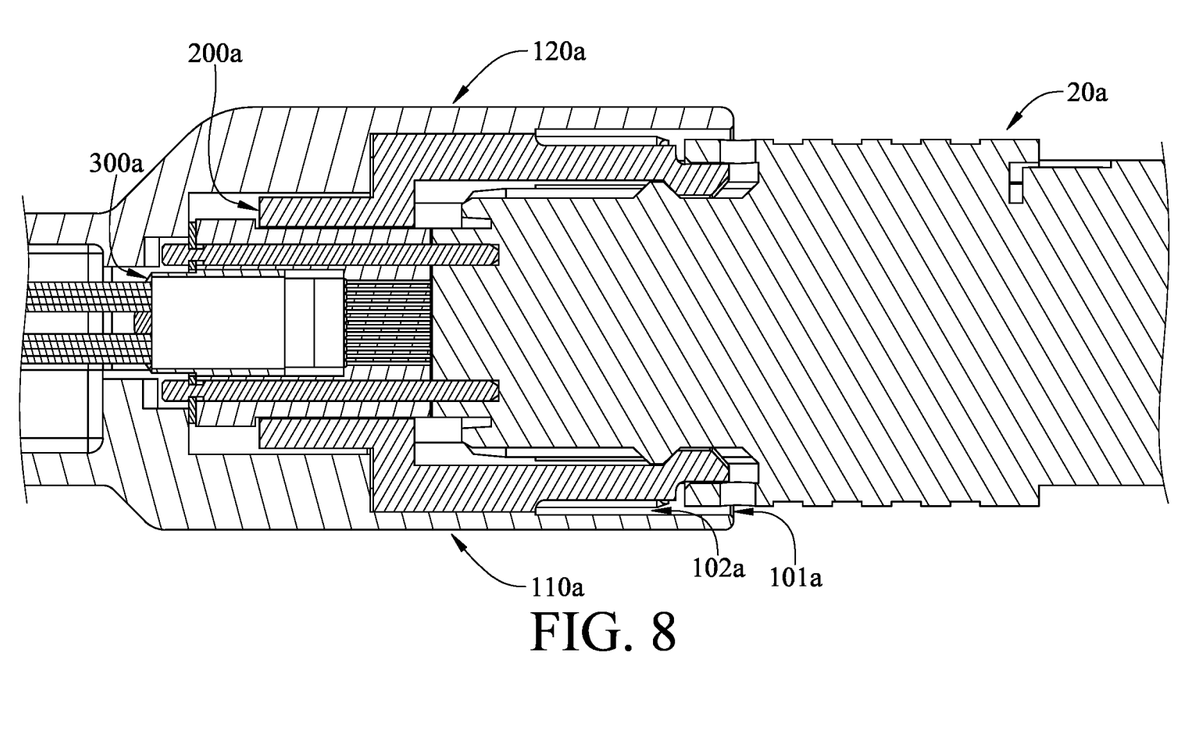
FIG. 8 is a partially enlarged cross-sectional view along line 8-8 in FIG. 5.

Please refer to FIGS. 6-8. FIG. 7 is a partially enlarged cross-sectional view along line 7-7 in FIG. 5. FIG. 8 is a partially enlarged cross-sectional view along line 8-8 in FIG. 5.

The housing 100a may include a first housing 110a, a second housing 120a, a first partition 130a and a second partition 140a. In this embodiment, the first housing 110a may include a first plate 1100a and two first side plates 1101a. The two first side plates 1101a may stand on opposite sides of the first plate 1100a, respectively. The two first side plates 1101a may be spaced apart from each other. The first partition 130a may stand on the first plate 1100a, and may be located between the two first side plates 1101a. In this embodiment, the second housing 120a may include a second plate 1200a and two second side plates 1201a. The two second side plates 1201a may stand on opposite sides of the second plate 1200a, respectively. The two second side plates 1201a may be spaced apart from each other. The second partition 140a may stand on the second plate 1200a, and may be located between the two second side plates 1201a. The two first side plates 1101a may be stacked on the two second side plates 1201a along an assembling direction D1, respectively. The first partition 130a may be stacked on the second partition 140a along the assembling direction D1. The first housing 110a, the second housing 120a, the first partition 130a and the second partition 140a may together form a first opening 101a, a first accommodation space 102a, a second opening 103a and a second accommodation space 104a. The first opening 101a and the second opening 103a may be located on a side of the housing 100a, and may be spaced apart from each other. The first opening 101a and the second opening 103a may be connected to the first accommodation space 102a and the second accommodation space 104a, respectively. In this embodiment, the first opening 101a and the second opening 103a may be arranged along an arranging direction D2 perpendicular to the assembling direction D1 to enhance a space utilization of the housing 100a. However, the disclosure is not limited to the direction along which the first opening 101a and the second opening 103a are arranged. In other embodiments, as long as the optical transceiver comports with the size specification, the first opening and the second opening may be arranged along a direction parallel to the assembling direction.

The first connector coupler 200a and the second connector coupler 250a may be disposed in the first accommodation space 102a and the second accommodation space 104a, respectively. The first connector coupler 200a and the second connector coupler 250a may be similar to the connector coupler 200 according to the first embodiment in FIGS. 1-4 in structure. The main difference between the first connector coupler 200a and the second connector coupler 250a according to the second embodiment and the connector coupler 200 according to the first embodiment in FIGS. 1-4 may be in that the placing direction of the first connector coupler 200a and the second connector coupler 250a relative to the housing 100a is perpendicular to that of the connector coupler 200 relative to the housing 100 in FIGS. 1-4. In this embodiment, the first connector coupler 200a may include a positioning frame 210a, a plurality of elastic holding arms 220a and tow elastic fastening arms 230a, and the second connector coupler 250a may include a positioning frame 260a, a plurality of elastic holding arms 270a and two elastic fastening arms 280a. The detailed structure of the first connector coupler 200a and the detail structure of the second connector coupler 250a may be understood by referring to the related descriptions of the connector coupler 200 according to the first embodiment in FIGS. 1-4.

The first internal optical connector 300a and the second internal optical connector 330a may be disposed in the first accommodation space 102a and the second accommodation space 104a, respectively. The first internal optical connector 300a and the first external optical connector 20a may be held in position via the first connector coupler 200a. The second internal optical connector 330a and the second external optical connector 30a may be held in position via the second connector coupler 250a. The manner for the first internal optical connector 300a and the first external optical connector 20a to be held in position via the first connector coupler 200a, and the manner for the second internal optical connector 330a and the second external optical connector 30a to be held in position via the second connector coupler 250a may be understood by referring to the corresponding description for the internal optical connector 300 and the external optical connector 20 to be held in position via the connector coupler 200 according to the first embodiment in FIGS. 1-4, and thus the repeated descriptions are omitted. The first external optical connector 20a and the second external optical connector 30a may be configured to penetrate through the first opening 101a and the second opening 103a, respectively. The first external optical connector 20a and the second external optical connector 30a may be plugged with and optically coupled to the first internal optical connector 300a and the second internal optical connector 330a, respectively.

In other embodiments where the housing of the optical transceiver at least includes the first opening and the second opening, the first connector coupler and the second connector coupler may not include the elastic holding arms.

The two first guiding protrusions 350a may protrude from one of the two first side plates 1101a and the first partition 130a, respectively. The two first guiding protrusions 350a may face each other. The two first guiding protrusions 350a may be located in the first accommodation space 102a, and may be located between the first opening 101a and the first connector coupler 200a to guide the movement of the first external optical connector 20a. The two second guiding protrusions 400a may protrude from the other first side plate 1101a and the first partition 130a, respectively. The two second guiding protrusions 400a may face each other. The two second guiding protrusions 400a may be located in the second accommodation space 104a, and may be located between the second opening 103a and the second connector coupler 250a to guide the movement of the second external optical connector 30a. The two first guiding protrusions 350a, the two second guiding protrusions 400a, the first housing 110a and the first partition 130a may be integrally formed as a single piece.

In this embodiment, the optical transceiver 10a may further include two third guiding protrusions 360a and two fourth guiding protrusions 410a. The two third guiding protrusions 360a may protrude from one of the two second side plates 1201a and the second partition 140a, respectively. The two third guiding protrusions 360a may face each other. The two third guiding protrusions 360a may be located in the first accommodation space 102a, and may be located between the first opening 101a and the first connector coupler 200a to guide the movement of the first external optical connector 20a. In other words, in this embodiment, the movement of the first external optical connector 20a may be guided by the two first guiding protrusions 350a and the two third guiding protrusions 360a. The two fourth guiding protrusions 410a may protrude from the other second side plate 1201a and the second partition 140a, respectively. The two fourth guiding protrusions 410a may face each other. The two fourth guiding protrusions 410a may be located in the second accommodation space 104a, and may be located between the second opening 103a and the second connector coupler 250a to guide the movement of the second external optical connector 30a. In short, in this embodiment, the movement of the second external optical connector 30a may be guided by the two second guiding protrusions 400a and the two fourth guiding protrusions 410a. The two third guiding protrusions 360a, the two fourth guiding protrusions 410a, the second housing 120a and the second partition 140a may be integrally formed as a single piece.

In this embodiment, the first housing 110a may have two first confining recesses 1110a and 1111a spaced apart from each other. The first confining recesses 1110a and 1111a may be connected to the first accommodation space 102a and the second accommodation space 104a, respectively. The first guiding protrusion 350a may be located between the first confining recess 1110a and the opening 101a. The second guiding protrusion 400a may be located between the first confining recess 1111a and the opening 103a. In this embodiment, the second housing 120a may have two second confining recesses 1210a and 1211a spaced apart from each other. The second confining recesses 1210a and 1211a may be connected to the first accommodation space 102a and the second accommodation space 104a, respectively. The second confining recess 1210a may be located opposite to the first confining recess 1110a, and the first guiding protrusion 350a may be located between the second confining recess 1210a and the opening 101a. The second confining recess 1211a may be located opposite to the first confining recess 1111a, and the second guiding protrusion 400a may be located between the second confining recess 1211a and the opening 103a.

According to the optical transceiver disclosed by above embodiments, the connector coupler may include at least one elastic holding arm protruding from the positioning frame and the at least one elastic holding arm may surround at least a part of the internal optical connector to hold the internal optical connector in position. Thus, comparing to a conventional optical transceiver that holds the internal optical connector in position by a pressing arm fixed to the housing by at least one screw, the pressing arm and the at least one screw may be no longer necessary. As such, the material used for manufacturing the optical transceiver may be reduced, thereby simplifying the assembling process of the optical transceiver and reducing the manufacture cost of the optical transceiver.

In addition, the two first guiding protrusions, the two second guiding protrusions, the first housing and the first partition may be integrally formed as a single piece. Therefore, a recess for accommodating the first guiding protrusion may be formed between the first contact surface and the opening, and another recess for accommodating the second guiding protrusion may be formed between the second contact surface and the opening. Accordingly, the connector coupler may not include any guiding structure for guiding the movement of the external optical connector, and thus the structure of the connector coupler may be simplified and the space occupied by the connector coupler in the housing may be reduced. Also, the structural strength of the material of the housing may be stronger than that of the connector coupler. Compared with the conventional optical transceiver whose connector coupler includes at least one guiding structure, the guiding structure integrally formed as a single piece with the first housing may have reduced thickness to reach the desired structural strength. In this way, the optical transceiver may comport with size specification with a plurality of optical connectors plugged therein.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, configured for an external optical connector to be plugged therein, the optical transceiver comprising:
a housing, wherein an opening of the housing is located on a side of the housing and is connected to an accommodation space of the housing;
a connector coupler, comprising a positioning frame and at least one elastic holding arm, wherein the at least one elastic holding arm protrudes from the positioning frame and forms a holding space, the positioning frame is located between at least a part of the at least one elastic holding arm and the opening, the positioning frame is disposed in the accommodation space, and a positioning recess of the positioning frame is located on a side of the positioning frame close to the opening and is connected to the holding space; and
an internal optical connector, wherein at least a part of the internal optical connector is located in the holding space to be held in position by the at least one elastic holding arm, and the positioning recess of the positioning frame is configured to position the external optical connector so as to allow the internal optical connector to be plugged with and optically coupled to the external optical connector.

2. The optical transceiver according to claim 1, wherein the at least one elastic holding arm comprises a plurality of elastic holding arms, and the plurality of elastic holding arms are spaced apart from one another and together form the holding space.

3. The optical transceiver according to claim 1, further comprising a first guiding protrusion and a second guiding protrusion, wherein the housing comprises a first housing and a second housing, the first housing is disposed on a side of the second housing, the first housing and the second housing together form the opening and the accommodation space, the first guiding protrusion and the second guiding protrusion protrude from the first housing and the second housing, respectively, the first guiding protrusion and the second guiding protrusion are located in the accommodation space, the first guiding protrusion and the first housing are integrally formed as a single piece, the second guiding protrusion and the second housing are integrally formed as a single piece, and the first guiding protrusion and the second guiding protrusion face each other and are located between the opening and the positioning frame of the connector coupler to be configured to guide a movement of the external optical connector.

4. The optical transceiver according to claim 3, wherein a first confining recess of the first housing is connected to the accommodation space, the first guiding protrusion is located between the first confining recess and the opening, a second confining recess of the second housing is connected to the accommodation space, the second guiding protrusion is located between the second confining recess and the opening, and opposite sides of the positioning frame of the connector coupler are accommodated in the first confining recess and the second confining recess, respectively.

5. The optical transceiver according to claim 4, wherein the connector coupler further comprises two elastic fastening arms, each of the two elastic fastening arms comprises a cantilever and a fastening protrusion, the two cantilevers of the two elastic fastening arms protrude from the positioning frame and are spaced apart from each other, at least a part of each of the two elastic fastening arms is located between the positioning frame and the opening, the two fastening protrusions protrude from the two cantilevers, respectively, the two fastening protrusions are located between the two cantilevers, and the two fastening protrusions are configured to be fastened in two fastening slots of the external optical connector.

6. The optical transceiver according to claim 5, wherein an end surface of the positioning frame of the connector coupler faces toward the opening, the end surface comprise a first contact surface, two side end surfaces and a second contact surface, the two side end surfaces are spaced apart from each other, opposite sides of each of the two side end surfaces are connected to the first contact surface and the second contact surface, respectively, the first contact surface is located in the first confining recess to be in contact with the first guiding protrusion, the second contact surface is located in the second confining recess to be in contact with the second guiding protrusion, the two cantilevers of the two elastic fastening arms protrude from the two side end surfaces, respectively, and the two side end surfaces are coplanar with the first contact surface and the second contact surface.

7. An optical transceiver, configured for a first external optical connector and a second external optical connector to be plugged therein, the optical transceiver comprising:
   a housing, comprising a first housing, a second housing, a first partition and a second partition, wherein the first housing is disposed on a side of the second housing, the first partition and the second partition are disposed in the first housing and the second housing, respectively, the first housing, the second housing, the first partition and the second partition together form a first opening, a first accommodation space, a second opening and a second accommodation space, the first opening and the second opening are located on a side of the housing and are spaced apart from each other, and the first opening and the second opening are connected to the first accommodation space and the second accommodation space, respectively;
   a first connector coupler and a second connector coupler, disposed in the first accommodation space and the second accommodation space, respectively;
   a first internal optical connector and a second internal optical connector, disposed in the first accommodation space and the second accommodation space, respectively, wherein the first internal optical connector and the first external optical connector are configured to be held in position via the first connector coupler, the second internal optical connector and the second external optical connector are configured to be held in position via the second connector coupler, the first opening and the second opening are configured for the first external optical connector and the second external optical connector to penetrate therethrough, respectively, so as to allow the first external optical connector and the second external optical connector to be plugged with and optically coupled to the first internal optical connector and the second internal optical connector, respectively;
   two first guiding protrusions, protruding from the first housing and the first partition, respectively, wherein the two first guiding protrusions are located in the first accommodation space, the two first guiding protrusions face each other and are located between the first opening and the first connector coupler to guide a movement of the first external optical connector; and
   two second guiding protrusions, protruding from the first housing and the first partition, respectively, wherein the two second guiding protrusions are located in the second accommodation space, the two second guiding protrusions face each other and are located between the second opening and the second connector coupler to guide a movement of the second external optical connector;
   wherein, the two first guiding protrusions, the two second guiding protrusions, the first housing and the first partition are integrally formed as a single piece.

8. The optical transceiver according to claim 7, wherein the first housing and the second housing are stacked on each other along an assembling direction, and the first opening and the second opening are arranged along an arranging direction perpendicular to the assembling direction.

9. The optical transceiver according to claim 8, wherein the first housing comprises a first plate and two first side plates, the two first side plates stand on opposite sides of the first plate, respectively, the two first side plates are spaced apart from each other, the first partition stands on the first plate and is located between the two first side plates, the second housing comprises a second plate and two second side plates, the two second side plates stand on opposite sides of the second plate, respectively, the two second side plates are spaced apart from each other, the second partition stands on the second plate and is located between the two second side plates, the two first side plates are stacked on the two second side plates along the assembling direction, respectively, the first partition is stacked on the second partition along the assembling direction, the two first guiding protrusions protrude from one of the two first side plates and the first partition, respectively, and the second guiding protrusions protrude from another one of the first side plates and the first partition, respectively.

10. The optical transceiver according to claim 7, further comprising:
   two third guiding protrusions, protruding from the second housing and the second partition, respectively, wherein the two third guiding protrusions are located in the first accommodation space, the two third guiding protrusions are located opposite to each other and are located between the first opening and the first connector coupler to guide the movement of the first external optical connector; and
   two fourth guiding protrusions, protruding from the second housing and the second partition, respectively, wherein the two fourth guiding protrusions are located in the second accommodation space, the two second guiding protrusions are located opposite to each other and are located between the second opening and the second connector coupler to guide the movement of the second external optical connector;
   wherein, the two third guiding protrusions, the two fourth guiding protrusions, the second housing and the second partition are integrally formed as a single piece.

* * * * *